J. VAN ACKEREN.
AMMONIA AND TAR RECOVERY PROCESS.
APPLICATION FILED AUG. 21, 1919.

1,375,476. Patented Apr. 19, 1921.

UNITED STATES PATENT OFFICE.

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,375,476.        Specification of Letters Patent.     Patented Apr. 19, 1921.

Application filed August 21, 1919. Serial No. 318,890.

*To all whom it may concern:*

Be it known that I, JOSEPH VAN ACKEREN, a citizen of the United States, residing in Pittsburgh, in the county of Allegheny and State of Pennsylvania, have invented a new and useful Improvement in Ammonia and Tar Recovery Processes, of which the following is a specification.

This invention relates primarily to the recovery of tar and of ammonia from producer-gas and has for its object the efficient production of a clean, dust-free and high-grade tar and of a clean, tar-free and dry ammonium sulfate that has a high content of ammonia and is of the large crystal type and is produced with great economy of heat or steam and with simplicity and directness in the operation of the apparatus; the invention may also be applied to the treatment of gas that is otherwise derived from the carbonization of coal, and may also have such other objects and results as are found to obtain in the processes hereinafter set forth and claimed.

In the accompanying drawings:

Figure 1 is a conventional diagram illustrating an embodiment of the invention in a preferred arrangement of apparatus for practising its processes;

Fig. 2 is a key to the symbols employed in the various lines that show the connection between the apparatus indicated in Fig. 1.

Referring to the drawings,

There is indicated at 6 a gas-producer, from which the producer-gas passes through the gas line 7 to the electrical dust precipitator 8. The producer-gas entering this electrical precipitator is still at a very high temperature, about 450° C., and therefore it is still greatly super-heated with respect to its water and tar, and these, and its other vaporizable contents, are carried as vapor into and through said precipitator 8. In said precipitator 8, the producer-gas flows in counter-current with hot water from the electrical tar precipitator 12, and, as a result of the heat interchange between the producer-gas and the hot water in said electrical dust precipitator 8, the hot water is converted into steam which passes to the steam-dome 9 of the electrical dust precipitator 8 and thence flows out the steam line 10. In addition to cooling the producer-gas, the electrical dust precipitator 8 acts also to free the passing gas from dust and other solid impurities in its current.

The gas, after having been cooled to about 120° C., passes through the gas line 11, still carrying its water and tar as vapor, to the electrical precipitator 12 which it enters at a temperature of about 120° C. At such temperature the tar, approaching the character of a finely comminuted mist, will be precipitated; and the clean tar so precipitated is discharged through the tar line 13 into the tar tank 14. In the electrical tar precipitator 12, the gas flows in counter-current with the water that is subsequently converted into steam in the electrical dust precipitator 8. The water enters the electrical tar precipitator 12 through the water line 15 at about 25° C. and as a result of the heat interchange between the water and the gas in the electrical tar precipitator 12 the water emerges from said precipitator 12 with its temperature elevated to about 100° C., and passes through the hot water line 16 to the aforesaid electrical dust precipitator 8. By reason of the fact that the gas in the electrical tar precipitator 12 is cooled from about 120° C. to about 80° C., said gas passes through the most efficient range of temperatures for the precipitation of the tar; thus, practically all of the tar is precipitated in the electrical tar precipitator 12.

The producer-gas passes from said tar-precipitator 12 through the gas line 17 to the hot acid-washer tower 18, which it enters at a temperature of about 80° C. In the aforesaid acid tower, the ammonia is absorbed from the gas, and the ammonia-freed gas leaves the acid-washer at a temperature of about 80° C.; the acid-solution is kept hot by the absorption reaction, so that there cannot be any diluting of the ammonia-absorbing acid-solution that is flowing through said acid-washer; and by reason of the little super-heat remaining in the gas practically no water is picked up by the gas in passing through said acid-washer, and consequently there is no precipitation of ammonium sulfate in said acid-washer. Thence, the ammonia-freed gas flows through the acid separator 19, in which it is freed of such acid as it may carry with it, and then flows through the gas line 20 into the first-stage final-cooler 21.

In the first-stage final-cooler 21 the ammonia-freed producer-gas flows in counter-current with warm water that enters such cooler at about 50° C.; as a result of the heat interchange, the gas is cooled to about 65° C., and to a great extent dehydrated and thence passes, through the gas line 22, to the second-stage final-cooler 23, through which it passes in counter-current with cold water of about 25° C. and issues finally dehydrated and cooled to a temperature of about 25° C. Such clean, cool and relatively dry gas is drawn off through the gas line 24 by the exhauster 25 and thence forwarded through the gas line 26 to the gas holder 27, from which the gas may be conducted to any service it may be employed in.

The ammonia-charged acid solution passes from the acid-tower 18 through the acid line 28 to the ammonia-saturator 29 into which preheated air flows through the air line 30, to effect the evaporation requisite to precipitate the ammonium sulfate, in the ordinary manner of such precipitation in a saturator. The air for effecting the precipitation of ammonium sulfate in the saturator 29 is drawn in from the atmosphere by an air fan 31 and passes through the air line 32 to and through a small superheater 33, heated by steam; from said superheater the air passes to the air line 30 and enters the ammonia saturator 29, with its temperature elevated a few degrees C. The ammonium sulfate is drawn off from the saturator in the usual manner and passes over the drain-table 34 and into the centrifugal drier 35, from which it is discharged to the conveyer-belt, to be carried to the storage pile of the by-product house; this ammonium sulfate has the dry, clean and large crystal character, with high ammonia content, of the high-grade ammonium sulfate that may be derived from saturator-processing of coke-oven gas.

The producer-gas from the producer, until it reaches the final coolers 21, 23, carries a great amount of water vapor and its volume in such super-heated condition is enormously greater than after it has been dehydrated and cooled in the final-coolers. In its dried and cooled condition, a far less volume is required to pass through the exhauster 25, and the exhauster is not required to be of impracticably large dimensions.

The acid-solution from the drain-table 34 is received in the mother-liquor tank 36 which also receives, from the acid-line 28 the acid-solution that by-passes the saturator; and the acid-solution received in said tank 36 is drawn through the further acid-line 37 to the acid-pump 38 and thence is forwarded through the return acid-line 39 to the acid-washer 18, the latter receiving also fresh acid from the acid tank 40, such returned acid-solution being still sufficiently heated to prevent cooling of the acid-solution that is receiving heat from the absorption reaction in said acid-washer. A continuous circulation of hot acid-solution is maintained through the acid-washer and thence to the saturator, and back to the acid-washer.

The aforesaid first-stage final-cooler 21 receives its water at a temperature of about 50° C. and discharges it at a temperature of about 80° C. and such discharged hot water is forced through the hot-water line 41 by the hot water pump 42 to the air-saturator tower 43; and from that tower the water issues cooled to a temperature of about 50° C. and is forced through the warm-water line 44 by the warm-water pump 45, to the first-stage final-cooler 21 in which the ammonia-freed producer-gas undergoes the first stage of its final cooling.

The air carrying with it the water vapor evaporated from the ammonia-charged acid solution during the precipitation of the ammonium sulfate in the ammonia-saturator 29 emerges from such saturator at a temperature raised a few degrees and passes through the air line 46 to the aforesaid air-saturator tower 43. In this tower 43, the air passing through the water introduced from the before-mentioned hot-water line 41, is heated and takes up more water vapor and issues charged with water vapor, at a temperature of about 80° C. The air from the saturator 43 passes through an air-line 47 to an air-heater 48 which is preferably heated by hot producer-gas supplied from a branch 49 of the producer-gas line 20. The super-heater 48 may be made comparatively small as the flame temperature of producer-gas is comparatively high, so that the temperature difference between the producer waste-gases and the air in the super-heater 48 is very great.

Because of the fact that the air is superheated to a very high temperature in the heater 48, the saturation point of the air is raised enabling the air to carry considerably more water vapor. This water vapor is supplied from the steam-line 10 through which the steam generated in the electrical dust precipitator 8 flows to the air line 47 and mixes with the air before it enters the superheater 48. The admixed steam has the further effect of increasing the temperature of the air before it enters the said superheater 48. By the employment of the electrical dust precipitator as a steam generator, the heat of the hot producer-gas from the producer is utilized to generate steam for charging the air before it enters the super-heater 48, and hence renders unnecessary or at least minimizes the amount of outside steam for charging the air. The air laden with water vapor and heated to a temperature of about 250° C. emerges from the super-heater 48 and passes through the air line 50 to the grate of the gas-producer 6 where it is utilized for the generation of the producer-gas.

Fresh water for cooling the producer-gas in the aforesaid second-stage final-cooler 23 is drawn in through a fresh water line 51 by fresh water pump 52 which forces the water to said cooler 23. The drain from said cooler discharges through a drain line 53.

The processes of the invention may be practised in various ways, other than the particular embodiment that has been described for purposes of illustration, and still be within the scope and subject matter of the claims hereinafter made.

I claim:

1. In a process for the recovery of tar and ammonia from producer-gas, the combination of steps that consists in: concurrently cooling the hot gas from the producer by passing it in counter-current with water and electrically precipitating the dust from said gas; then concurrently precipitating the tar from the partially cooled gas and passing the gas in counter-current with water that is going to the dust precipitation operation; conducting the steam generated during the dust precipitation operation to the air that is on its way to the gas-producer; absorbing the ammonia from the dust-freed and tar-freed producer-gas by passing such gas through an acid-wash; conveying the mother-liquor from such acid-wash to a saturation-bath; passing air through said saturation-bath, to effect deposition of the ammonium sulfate; passing the ammonia-freed gas through final cooling and dehydrating stages; heating and charging the air from the saturation-bath, with water vapor, by passing such air in counter-current with the hot water from the first-stage of the aforesaid final cooling of the gas; conveying the water from said air heating operation back to the first stage of the final gas-cooling; conducting the air from the said air heating and water vapor charging operation to the aforesaid steam-charging operation; then again heating the air and conveying it to the gas-producer; substantially as specified.

2. In a process for the recovery of tar and ammonia from producer-gas, the combination of steps that consists in: concurrently cooling the hot gas from the producer by passing it in counter-current with water and electrically precipitating the dust from said gas; then concurrently precipitating the tar from the partially cooled gas and passing the gas in counter-current with water that is going to the dust precipitation operation; conducting the steam generated during the dust precipitation operation to the air that is on its way to the gas-producer; absorbing the ammonia from the dust-freed and tar-freed producer-gas by passing such gas through an acid-wash; conveying the mother-liquor from such acid-wash to a saturation-bath; passing atmospheric air through a preheater and conveying such preheated air to and through said saturation bath, to effect deposition of the ammonium sulfate; passing the ammonia-freed gas through final cooling and dehydrating stages; heating and charging the air from the saturation-bath, with water vapor, by passing such air in counter-current with the hot water from the first-stage of the aforesaid final cooling of the gas; conveying the water from said air heating operation back to the first stage of the final gas-cooling; conducting the air from the said air heating and water vapor charging operation to the aforesaid steam-charging operation; then again heating the air and conveying it to the gas-producer; substantially as specified.

3. The process for the production of tar and ammonia from producer-gas, which consists in: subjecting the hot gas from the producer to an indirect primary cooling operation by passing such gas in counter-current with water and concurrently electrically precipitating the dust from such gas; then precipitating the tar from the partially cooled gas and concurrently heating the water going to the aforesaid primary cooling operation by passing the gas in counter-current with such water; charging the air going to the producer with the steam generated during the primary cooling operation of the gas, to augment the production of ammonia in the producer; and recovering the ammonia from the cooled, tar-freed producer gas; substantially as specified.

4. The process for the production of tar and ammonia from producer-gas, which consists in: subjecting the hot gas from the producer to an indirect primary cooling operation by passing such gas in counter-current with water and concurrently electrically precipitating the dust from such gas; then precipitating the tar from the partially cooled gas and concurrently heating the water going to the aforesaid primary cooling operation by passing the gas in counter-current with such water; charging the air going to the producer with the steam generated during the primary cooling operation of the gas, to augment the production of ammonia in the producer; further heating the steam-charged air and conducting it to the producer; and recovering the ammonia from the cooled, tar-freed producer gas; substantially as specified.

5. The process for the production of tar and ammonia from producer-gas, which consists in: subjecting the hot gas from the producer to an indirect primary cooling operation by passing such gas in counter-current with water, electrically precipitating the dust from such gas; then precipitating the tar from the partially cooled gas and concurrently heating the water going to the aforesaid primary cooling operation by passing the gas in counter-current with such water; charging the air going to the producer with the steam generated during the primary cooling operation of the gas, to augment the production of ammonia in the producer; and recovering the ammonia from the cooled, tar-freed producer gas; substantially as specified.

6. In a process for the production of tar and ammonia from producer-gas, the combination of steps that consists in: subjecting the hot gas from the producer to an indirect primary cooling operation by passing such gas in counter-current with water and thereby generating steam; removing the tar and the ammonia from such gas; mixing the aforesaid steam with the air going to the gas-producer, to augment the production of ammonia in the producer; firing tar and ammonia freed producer-gas and utilizing the heat generated thereby for superheating the steam-charged air; substantially as specified.

7. In a process for the production of tar and ammonia from producer-gas, the combination of steps that consists in: effecting a heat exchange between the hot gas from the producer and water to cool the gas and generate steam; removing the tar and ammonia from the cooled gas; mixing such steam with the air going to the producer, to augment the production of ammonia in the producer; firing tar and ammonia freed producer-gas and utilizing the heat generated thereby for superheating the steam charged air; substantially as specified.

8. In a process for the production of tar and ammonia from producer-gas, the combination of steps that consists in: cooling the hot gas from the producer indirectly with water and thereby generating steam; removing the tar and ammonia from the cooled gas; mixing such steam with the air going to the producer to augment the production of ammonia in the producer; firing tar and ammonia freed producer-gas and utilizing the heat generated thereby for superheating the steam charged air; substantially as specified.

9. In a process for the recovery of tar and ammonia from producer-gas, the combination of steps that consists in: cooling the hot gas from the producer by passing it in counter-current with water and thereby generating steam, precipitating the dust from said gas; then precipitating the tar from the partially cooled gas; absorbing the ammonia from the dust-freed and tar-freed producer-gas by passing such gas through an acid-wash; conveying the mother-liquor from the acid-wash to a saturation-bath, passing air through said saturation-bath, to effect deposition of the ammonium sulfate; discharging the air from such saturation-bath and conducting the aforesaid steam to said air; and then conducting the steam-charged air to the gas producer; substantially as specified.

In testimony whereof I have hereunto set my hand this 15th day of August, 1919.

JOSEPH van ACKEREN.